United States Patent [19]

Itaya et al.

[11] Patent Number: 5,455,574
[45] Date of Patent: Oct. 3, 1995

[54] TOUCH PANEL DEVICE INCLUDING RESISTANCE MATERIAL AND POSITION DETECTING UNIT

[75] Inventors: Hisao Itaya; Satoru Nakagawa; Kensuke Taki; Kazuhiro Takano, all of Moriyama, Japan

[73] Assignee: Gunze Limited, Kyoto, Japan

[21] Appl. No.: 22,649

[22] Filed: Feb. 25, 1993

[30] Foreign Application Priority Data

Feb. 27, 1992 [JP] Japan .................................. 4-041181

[51] Int. Cl.[6] .................................................. G08C 21/00
[52] U.S. Cl. ................................................ 341/20; 178/18
[58] Field of Search ........................... 341/34, 26, 20; 178/20, 18; 345/174, 173; 74/469

[56] References Cited

U.S. PATENT DOCUMENTS 4,752,655  6/1988  Tajiri et al. ................. 178/20
5,008,497  4/1991  Asher .......................... 178/20

FOREIGN PATENT DOCUMENTS 64-46123   2/1989  Japan .
4-33015    2/1992  Japan .
4-182720   6/1992  Japan .

Primary Examiner—Donald J. Yusko
Assistant Examiner—Michael H. Day
Attorney, Agent, or Firm—Armstrong, Westerman, Hattori, McLeland & Naughton

[57] ABSTRACT

A touch panel device comprises a resistance material on which a potential gradient is formed extended along an X axis, a contact electrode to be pushed to contact with the resistance material, a potential supplying unit for selectively supplying to the contact electrode via a resistance via at least two kinds of potentials one by one, a potential detecting unit for detecting the potential at the contact electrode, and a pushed position detecting unit for detecting a X coordinate of the pushed position based on the potential detected by the potential detecting unit when the potentials are supplied thereto by the potential supplying unit.

11 Claims, 17 Drawing Sheets connected to pushed position/pressure detecting device 202 via resistance 17

TOUCH PANEL DEVICE INCLUDING RESISTANCE MATERIAL AND POSITION DETECTING UNIT

BACKGROUND OF THE INVENTION (1) Field of the Invention

This invention relates to a touch panel device for detecting a pushed position of the touch panel when it is pushed by a finger, or a stylus pen.

(2) Description of the Related Art

A simple input system including a touch panel and a detecting device for detecting a pushed position of the touch panel and for outputting a signal which indicates the two-dimensional coordinates of the position is widely used in combination with a character display device, a graphic display or the like.

The input system mainly includes a resistance film type touch panel device and a capacitance type touch panel device. According to the former device, when external force is applied to a resistance film so that the electrode contacts with the resistance film, the pushed position is detected being based on the potential of the electrode.

To be concrete, for example in FIG. 1, a couple of resistance films 301 and 302 oppose to each other with a certain distance therebetween. The film 301 has outer connecting electrodes 303 and 304 along ends thereof, the ends extending along an X axis; and film 302 has connecting electrodes 305 and 306 along ends thereof, the ends extending along an Y axis.

The outer connecting electrodes 304 and 306 are connected to a voltage source V1 via a switch unit or to voltage source V2 via the switch unit 307 and a resistor 309. The outer connecting electrodes 305 and 306 are connected to an earth or a voltage detecting unit 308 alternatively via the switch unit 307.

In FIG. 1 the switch unit 307 is switched so that the electrodes 304, 306, 303, and 305 are connected to the voltage source V1, V2, an earth, or the unit 308 respectively. When the film 301 is pushed and contacts with the film 302 at point P, potential is supplied to the film 302 in accordance with a ratio of r1:r2. Then, potential in accordance with Y coordinate of the point P is detected by the voltage detecting unit 308. Similarly, when the switch unit 307 is inverted, potential in accordance with X coordinate of the point P is detected.

Contrary, voltage value V2 is detected by the unit 308 when the film 301 is not pushed. Therefore, existence or absence of pressure on the film 301 is detected by knowing whether or not the voltage detected by the unit 308 is V2.

The above detection of the pushed position on the touch panel has problems to be solved, which will be described hereunder. That is, the contact resistance between the films 301 and the 302 becomes large when very small external force is supplied to the film 301. The contact resistance therebetween may be large due to the films 301 and 302 changing their characteristics along a lapse of time. Accordingly, voltage drop across the contact resistance becomes large, resulting in a detection error which lowers accuracy of the pushed position.

Also when the Y coordinate of the pushed position P is detected, the potential at P of the film 301 deviates due to current flown via a resistance r4 of the resistance film 302 and the voltage detecting unit 308 and/or current flown via the resistor 309 and a resistance r3. Consequently, a detection will be caused.

The above detection errors will be prevented by setting an input impedance of the unit 308 and the resistance of the resistor 309 to be high. However, another detection error caused by an external disturbance such as induction noise will be generated when the input impedance and the resistance are high.

Generally a lowpath filter is employed by the voltage detecting unit 308 to eliminate affect of high frequency noise. However, when the contact resistance between the films 301 and 302 is large, it takes long until the voltage detection converges, which is also a detection error.

Thus, according to the conventional touch panel device, the accurate detection of the pushed position is hardly possible with avoiding the effect of the induction noise.

SUMMARY OF THE INVENTION

Accordingly, this invention has an object to provide a touch panel device for accurate detection of a pushed position unaffected by a high contact resistance of a resistance film as well as for decrease of detection errors caused by an external disturbance such as an induction noise.

This object may be fulfilled by a touch panel device comprising a resistance material on which a potential gradient is formed in a main detecting direction, a contact electrode to be pushed to contact with the resistance material, a potential supplying unit for selectively supplying at least two kinds of potentials to the contact electrode via a resistor one by one, the potentials being different from each other, a potential detecting unit for detecting the potential at the contact electrode, and a pushed position detecting unit for detecting a pushed position along the main detecting direction based on the potentials detected by the potential detecting unit when the potentials are supplied thereto by the potential supplying unit.

In this construction, the pushed position is detected accurately by solving a plurality of equations which are generated in accordance with a pluralitly of potentials applied by the potential supplying unit since both the contact resistance between the resistance film and the contact electrodes, and the wiring resistance as unknown values can be eliminated.

To be concrete, the pushed position can be detected by the touch panel device wherein the pushed position detecting unit obtains a ratio x of a distance between a first end of the resistance material and the pushed position to another distance between the first end and a second end of the resistance material based on a computation result of a formula, the first end and the second end extending along the main detecting direction, $$X = \frac{E1\ VL - E2\ VH}{E0\ \{(E1 - VH) - (E2 - VL)\}}$$

in which E0 is the potential at the second end of the resistance material when the potential at the first end is 0; E1 and E2 are the potentials supplied by the potential supplying unit to the contact electrode; and VH and VL are the potentials detected by the potential detecting unit when the potential supplying unit supplies the potentials.

As mentioned above, neither the contact resistance nor the wiring resistance affects the detection of the pushed position. Therefore, the potential detecting unit and/or the A/D converter may be employed even when input impedance thereof are not considerably high as well as is the switch whose on-resistance is not very low. Accordingly, detection error caused by the external disturbance such as the induction noise reduces as well as does the production cost of the device.

Further, this invention has another object to provide the touch panel device for detecting the pressure while detecting the pushed position accurately.

This object may be fulfilled by, the touch panel device further comprising a pressure sensing conductive material in a path in which electric current is flown via the contact electrode as well as a pressure is transferred; and a pressure detecting unit for detecting the pressure put on the contact electrode based on the potentials detected by the potential detecting unit when the potentials are supplied to the contact electrode by the potential supplying unit.

In this construction, the unknown values such as resistances are all eliminated except the pushed position and the pressure; therefore, the pushed position and the pressure can be detected being unaffected by the contact resistance between the resistance material and the contact electrode or the wiring resistance.

More precisely, the pressure may be detected by the touch panel device wherein the pressure detecting unit obtains the pressure based on a value n' computed in a formula:

$$n' = \frac{(VH - VL) \cdot l}{(E1 - E2) - (VH - VL)} - R \cdot x \cdot (1 - x)$$

in which R is a resistance formed between a first end and a second end of the resistance material, the first end and the second end extending along the main detecting direction; x is a ratio of the distance between the first end and the pushed position to the distance between the first end and the second end of the resistance material; l is the resistance of the resistor; E0 is the potential at the second end of the resistance material when the potential at the first end is 0; E1 and E2 are the potentials supplied by the potential supplying unit to the contact electrode; and VH and VL are the potentials detected by the potential detecting unit when the potential supplying unit supplies the potentials.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Embodiment 1

Figure 1:
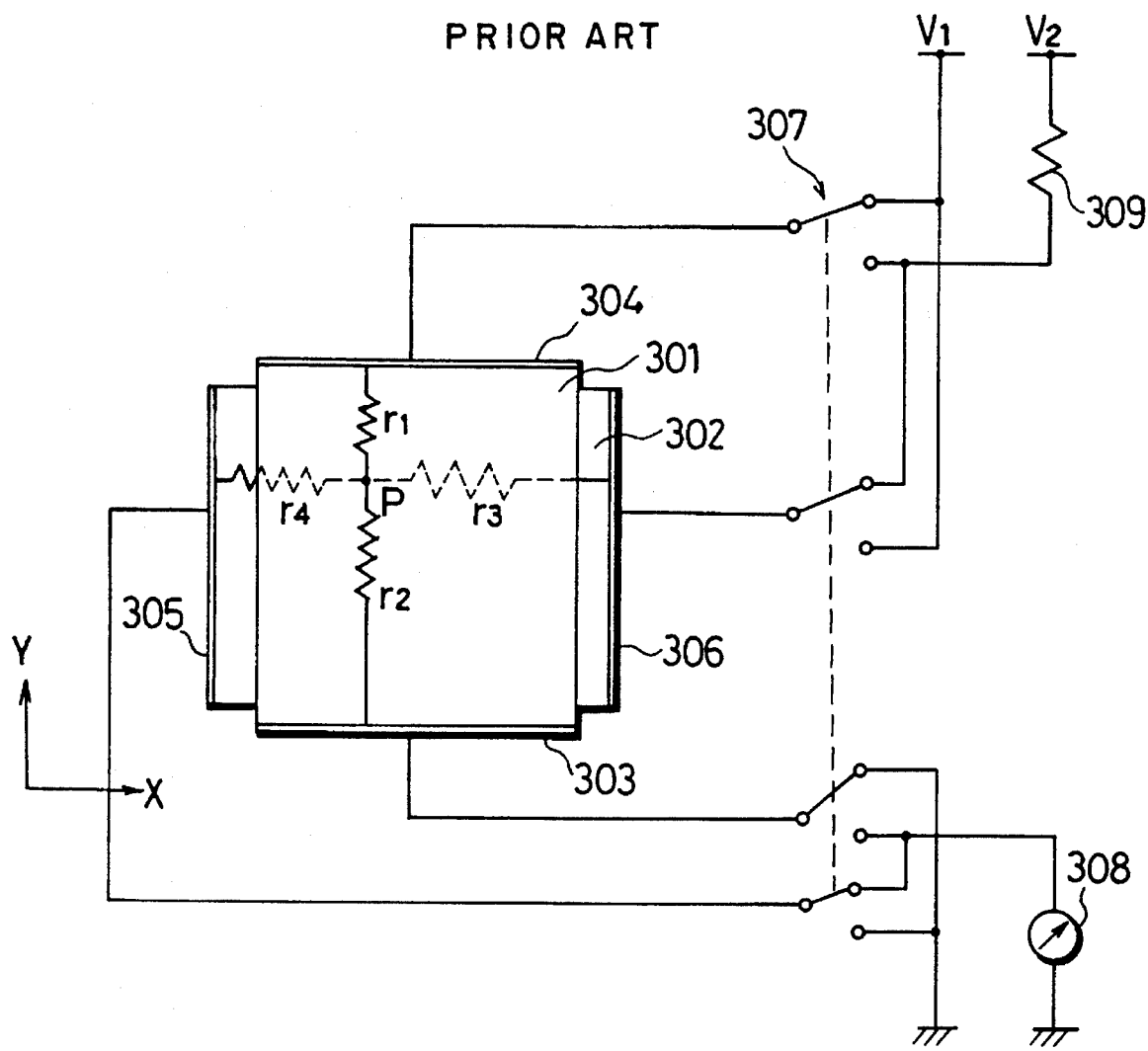
FIG. 1 is an illustration showing a construction of a conventional touch panel device.
Figure 2:
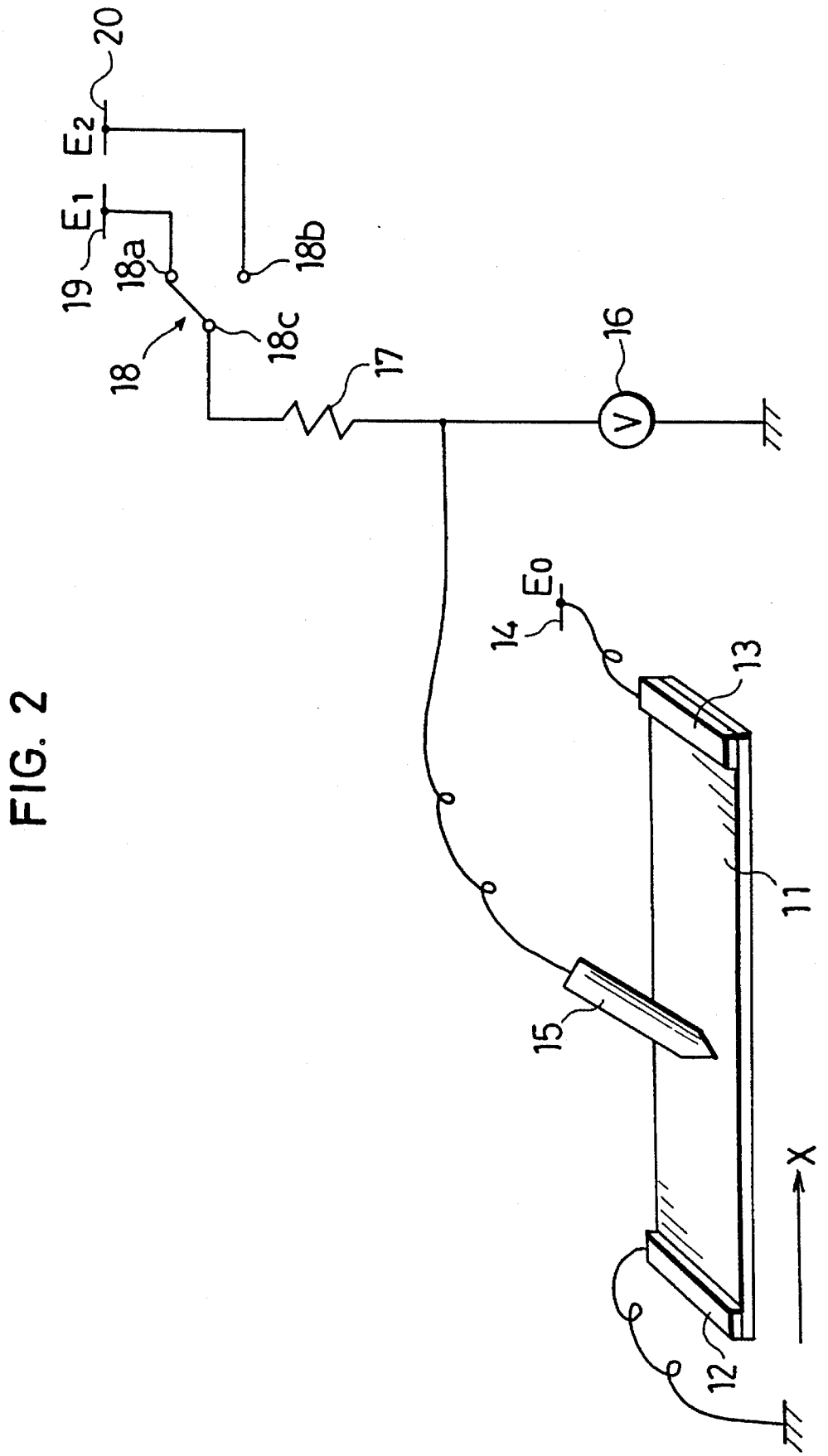
FIG. 2 is an illustration showing a construction of a touch panel device in a first embodiment of the present invention.
Figure 3:
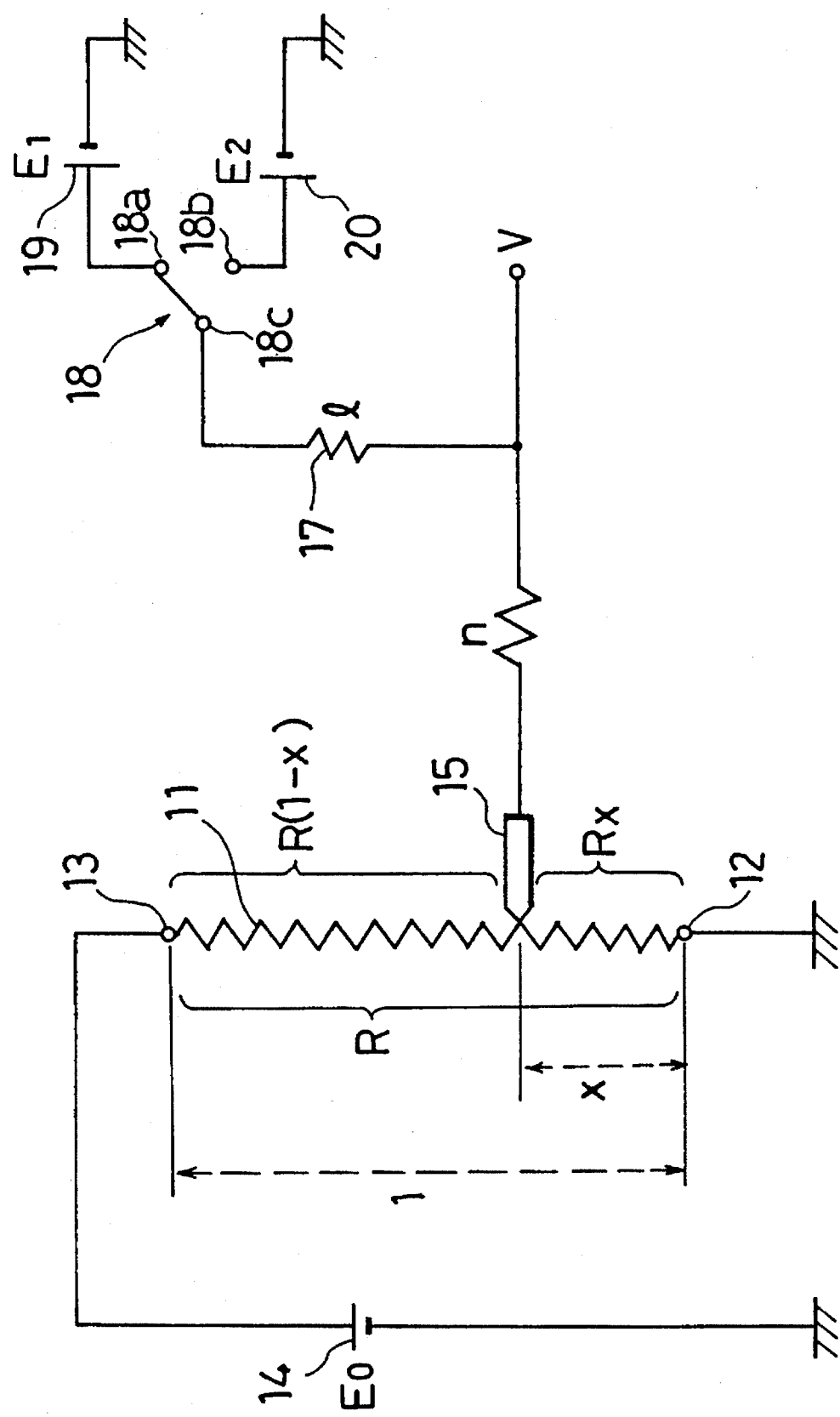
FIG. 3 is a circuit diagram showing a construction of a circuit construction of the touch panel device in the first embodiment of the present invention.
Figure 4:
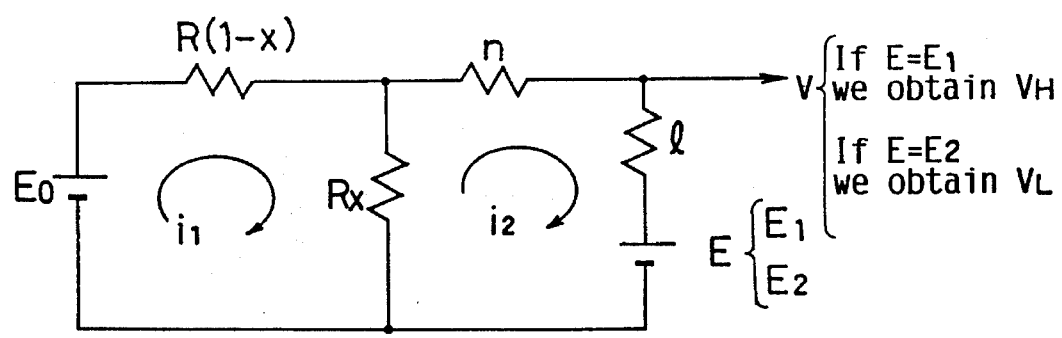
FIG. 4 is an illustration showing a circuit network which is generated in the first embodiment of the present invention.

A first embodiment of the present invention is described hereunder with referring to FIGS. 2 through 4.

A construction of a touch panel device for detecting a position pushed by a touch pen, the position along an X axis, is shown in FIG. 2; while a circuit diagram of the touch panel device is shown in FIG. 3. As shown in those figures, electrodes 12 and 13 are provided to ends of a resistance film 11 respectively, and a potential gradient along the X axis is formed on the film 11 in accordance with a potential of an earth and potential E0 of a power source 14, the earth and the power source 14 being connected to the above electrodes respectively.

A touch pen 15 is connected to a pushed position detecting unit 16 as well as to a closed center contact point 18c of a switch 18 via a resistor 17. Contact points 18a and 18b of the switch 18 are connected to a power source 19 of potential E1 and a power source 20 of potential E2.

The resistor 17 is a protection resistor to suppress amount of current when the film 11 is pushed at the position near the electrode 12.

A pushed position detecting unit 16 including an A/D converter, a micro computer and the like, detects the pushed position in accordance with two kinds of potentials, the potentials detected in accordance with a state of the switch 18.

FIG. 4 shown a circuit network of the circuit in FIG. 3. In the figure, a distance between the electrode at the earth's side and the pushed position is x when a distance between the electrodes 12 and 13 both provided to the ends of the resistance film 11 is l; a resistance of the film 11 between the electrodes 12 and 13 is R; a resistance of the resistor 17 is l; and total of resistances comprising the contact resistance between the touch pen 15 and the film 11, and a wiring resistance formed between the contact point and the resistor 17 is n.

The potentials VH and VL are respectively detected by the pushed position detecting unit 16 when the closed center contact point 18c is connected to the contact points 18a and 18b. Then, the distance x is obtained by applying those potentials to a formula 1 in accordance with the Kirchhoff's second law.

[Formula 1]
$$Ri1 - Rxi2 = E0 \quad (1)$$
$$-Rxi1 + (n + l + Rx)i2 = -E \quad (2)$$

From (1), (2)

$$i2 = \frac{+RxE0 - RE}{R(n + l + Rx) - R^2 x^2} \quad (3)$$

$$= \frac{xE0 - E}{n + l + Rx - Rx^2}$$

also $V = E1 + li2$ (4)

From (3), (4), if $E = E1, E2$ then $V(VH, VL)$ becomes $$VH = E1 + \frac{(xE0 - E1)}{n + l + Rx - Rx^2} \quad (5)$$

$$= \frac{(n + Rx - Rx^2)E1 + lxE0}{n + l + Rx - Rx^2}$$

$$VL = \frac{(n + Rx - Rx^2)E2 + lxE0}{n + l + Rx - Rx^2}$$

$(n + l + Rx - Rx^2)VH = (n + Rx - Rx^2)E1 + lxE0$
$(n + l + Rx - Rx^2)VL = (n + Rx - Rx^2)E2 + lxE0$
$n(Vh - E1) = lxE0 + (Rx - Rx^2)E1 - (l + Rx - Rx^2)VH$
$n(Vh - E2) = lxE0 + (Rx - Rx^2)E2 - (l + Rx - Rx^2)VL$ $$\frac{Vh - E1}{Vh - E2} = \frac{lxE0 + (Rx - Rx^2)E1 - (l + Rx - Rx^2)VH}{lxE0 + (Rx - Rx^2)E2 - (l + Rx - Rx^2)VL}$$

we solve (5) for X and obtain $$x = \frac{E1 \, VL - E2 \, VH}{E0 \{(E1 - VH) - (E2 - VL)\}}$$

It is apparent from the above computation that the resistance value R, l and n do not affect the result. That is, the distance x is obtained only with referring to potentials E0, E1, E2 as well as VH, VL.

Theoretically, modification of the formula 1 is possible unless l and E1 equal to 0 and E2 respectively. However, practically it should be considered that the value of l and difference between E1 and E2 affect the accuracy of detection. For example, 200Ω for R (R=200Ω) and 10kΩ for l (l=10kΩ) are desirable since they realize accurate detection even when the impedance of the A/D converter is low. Hence, with R of 200Ω and l of 10kΩ the accurate detection of the pushed position is obtained being unaffected by the contact resistance between 0 and 10kΩ (n=0–10kΩ). Further, in this case the external disturbance including the induction noise reduces considerably.

Finally, the number of power sources employed in the circuit reduces if E1 and E2 equal to E0 and 0 respectively. Accordingly, computation of Formula 1 will be simplified into that of Formula 2.

[Formula 2]

If $E1 = E0$ and $E2 = 0$ then $x$ becomes $x = \frac{VL}{E0 - VH + VL}$

Both circuits and formulas other than those mentioned in the above may also be employed in the present invention. That is, theoretically, when two potentials are applied, two equation are formed from a pair of the detected potentials. Accordingly, the distance x is obtained by eliminating the unknown resistance n. A formula further including the a pair of the resistances R and l may also be applied since resistances R and l are usually known so that equations can be solved to obtain the distance x. More than two potentials may be applied so that a plurality of xs are obtained and the distance x is obtained by making an average thereof.

Also, in the above detection it is supposed that the neither change in the contact resistance nor a time constant of the low path filter affects the potentials VL and VH. This is achieved by detecting potentials VH and VL when they become stable or smaller than the potentials E1 and E2 respectively. The potentials VH and VL smaller than the potentials E1 and E2 respectively are detected when external force is applied to the film. Also they become stable when they are detected a certain time later than detection of the external force on the film. Further, if the potentials VH and VL are not only smaller than the potentials E1 and E2 but also stable, more accurate detection of the pushed position will be implemented.

Embodiment 2

In a second embodiment of the present invention, a conductive film or a resistance film which has flexibility or elasticity replaces the touch pen 15 in the first embodiment.

Figure 5:
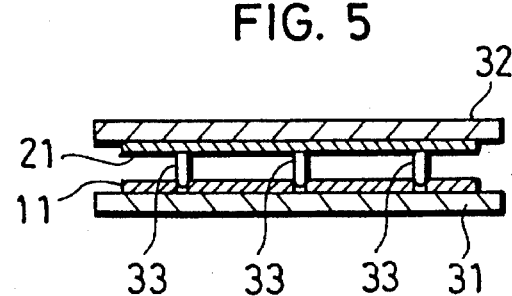
FIG. 5 is a sectional view of a touch panel body in a second embodiment of the present invention.

A construction of a touch panel device for detecting the pushed position is shown in FIG. 5. In the figure the resistance films 11 and 21 are mounted on the insulating base members 31 and 32 opposing to each other with a certain space therebetween, the space provided by a spacer 33. In this construction, when the insulating base member 32 is pushed, the resistance film 21 contacts with the resistance film 11; and the pushed position is detected from the films 21 and 11.

Figure 6:
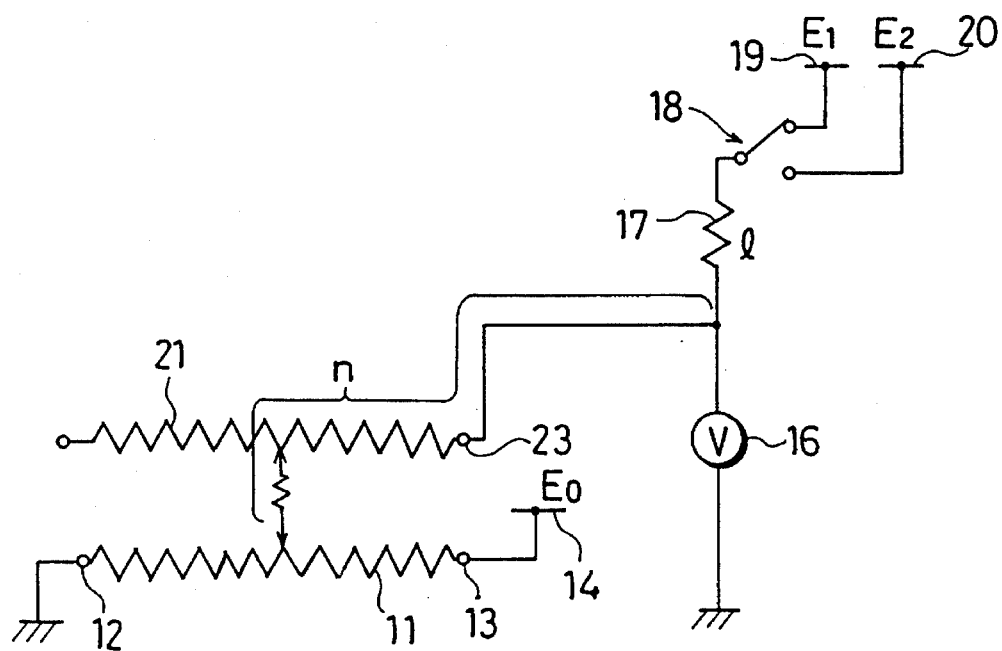
FIG. 6 is a circuit diagram showing a circuit construction of the touch panel device in the second embodiment of the present invention.

The pushed position in a circuit network of FIG. 6 is also obtained from the same formula as is applied to the first embodiment. However, in FIG. 6 n is employed for total of resistance comprising a contact resistance between the films 21 and 11, resistance of the resistance film 21 between the contact point and the electrode 23, and wiring resistance between the electrode 23 and the resistor 17.

Embodiment 3

Figure 7:
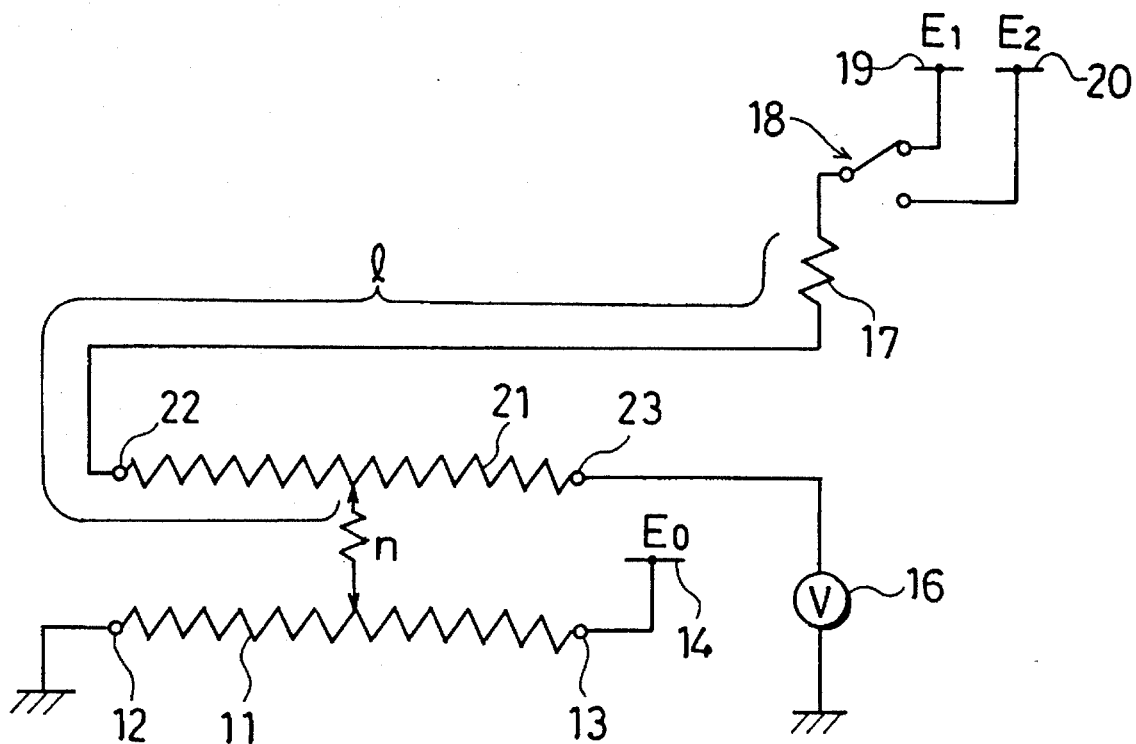
FIG. 7 is a circuit diagram showing a circuit construction of the touch panel device in a third embodiment of the present invention.

In a third embodiment, another example of the circuit network is employed. As shown in FIG. 7, the circuit network is formed from same components integrating the circuit in the second embodiment, and the pushed position in the circuit is obtained from the same formula as is applied to the first embodiment. However, in FIG. 7, n is employed for contact resistance between the resistance films 11 and 12 as well as the total of resistance 1 comprises resistance of the resistance film 21 between the contact point and the electrode 22, wiring resistance between the electrode 22 and the resistance 17, and the resistance of the resistor 17.

Figure 8:
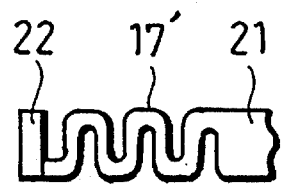
FIG. 8 is a partly plan view showing a resistance example formed of a zigzag line at an end of a resistance film.

The resistor 17 can be replaced with a strip-like zigzag line 17'. For example, in FIG. 8 the zigzag line 17' is constructed between the end of the resistance film 21 and the electrode 22. The zigzag line 17' can locate anywhere except the pushed position so that a pattern will not be broken and reliability and lifetime of the device will not be shorten by the zigzag line.

Embodiment 4

Figure 9:
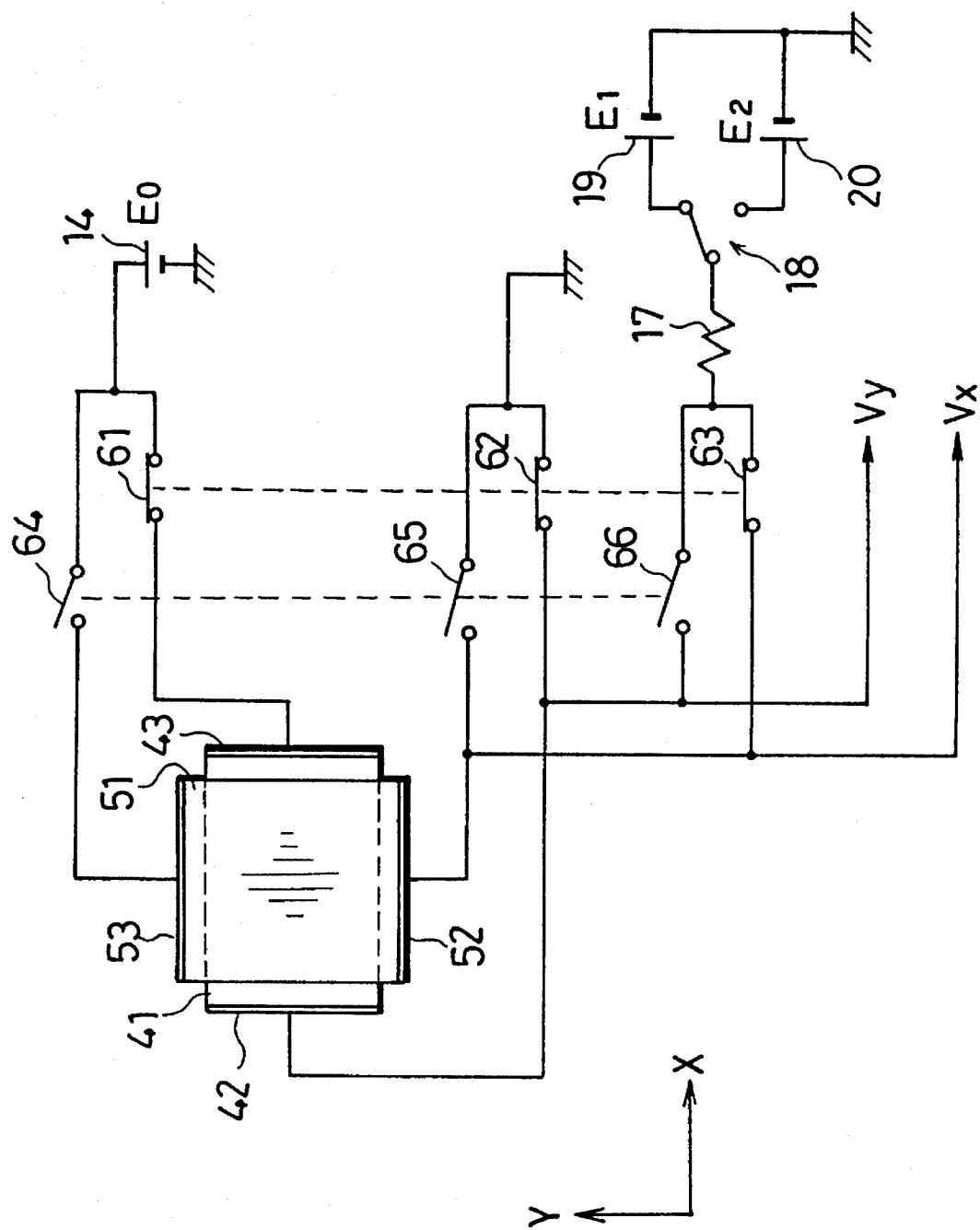
FIG. 9 is an illustration showing a construction of the touch panel device by which the two dimensional pushed position is detected in a forth embodiment of the present invention.

In a fourth embodiment of the present invention, a touch panel device detects two dimensional coordinates of the pushed position. A construction of the touch panel device is shown in FIG. 9. In the figure the resistance films 41 and 51 oppose to each other with a certain space therebetween, and the electrodes 42, 43 and electrodes 52, 53 are provided to both ends thereof respectively. The electrodes 42, 43, 52, 53 are connected to the power source 14, the earth, and the resistor 17 via the switches 61, 62, 63, 64, 65, 66 respectively. Further, the power source 14, the resistor 17, the switch 18, the power sources 19 and 20 in the first embodiment are employed. In this construction, the X and Y coordinates of the pushed position are detected by the pushed position detecting device 16 in accordance with the potentials Vx and Vy respectively. The detecting device 16 is the same as that in preceding three embodiments and is not illustrated in FIG. 9.

To be precise, when the switches 61–63 are switched as shown in the figure, the potential gradient along the X axis is formed on the film 41 due to the film 41 and the film 51 being relevant for the film 11 and the film 21 in the second embodiment. Also two potentials both referred to as Vx are detected, and the X coordinate of the pushed position is detected based on those two potentials.

Also, when the switches 64–66 are inverted, the Y coordinate of the pushed position is detected due to the film 41 and the film 51 operating opposite to the above.

Embodiment 5

Figure 10:
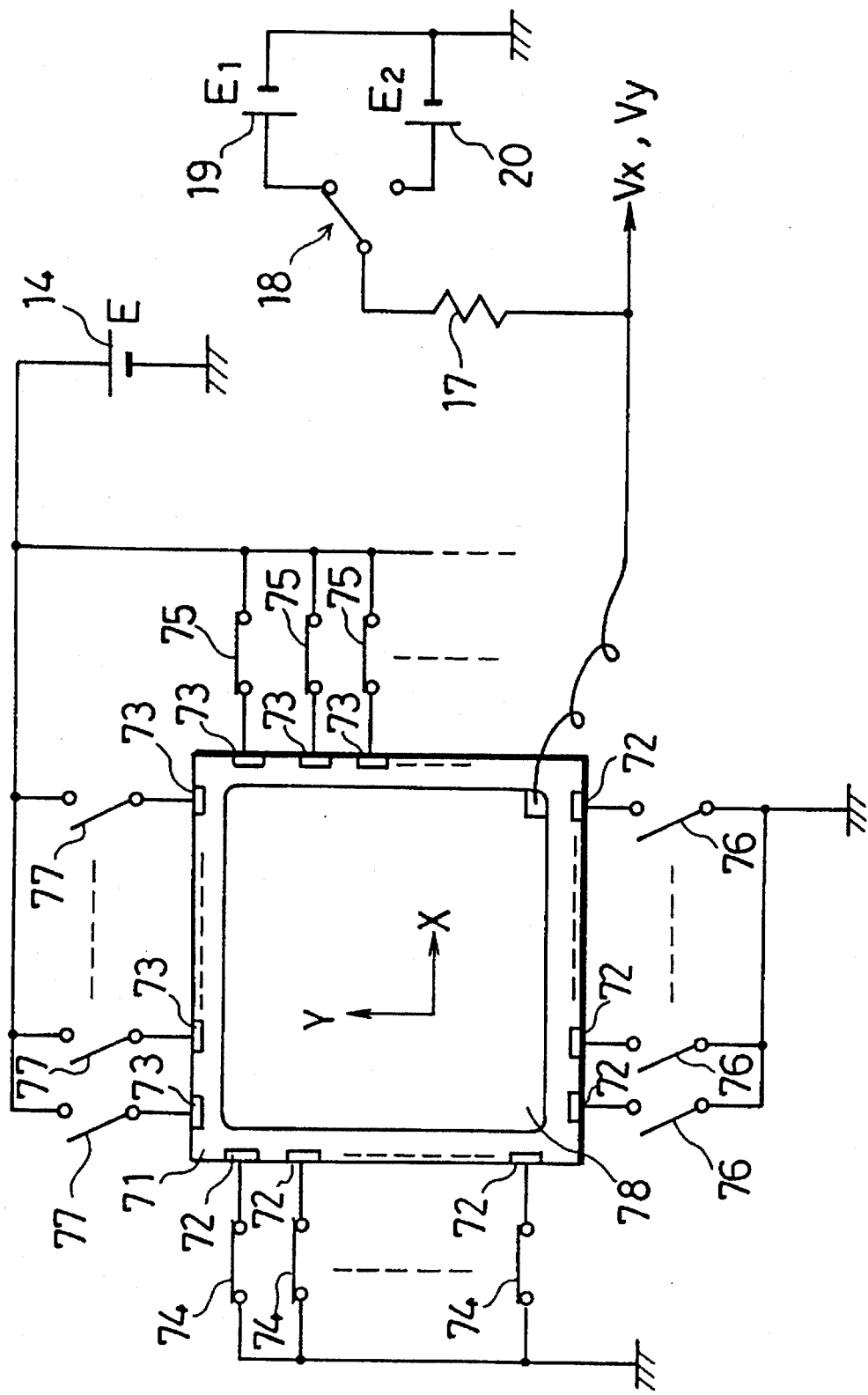
FIG. 10 is an illustration showing a construction of another touch panel device by which a two-dimension pushed point is detected in a fifth embodiment of the present invention.

In a fifth embodiment of the present invention another touch panel device detects two dimensional coordinates of the pushed position based on the potential gradients along the X and Y axes formed on the resistance film. A construction of the touch panel device in the fifth embodiment will be described hereunder with referring to FIG. 10. In the figure the electrodes 72 or the electrodes 73 are provided to all ends of the resistance film 71. Each of the electrodes 72 is connected to the earth via the switch 74 or the switch 76 while each of the electrodes 73 is connected to the power source 14 via the switch 75 or the switch 77.

A flexible conductive film 78 opposes to the resistance film 71 having a space therebetween and it is connected to a voltage applying circuit and a voltage detecting circuit, as mentioned in the fourth embodiment. The film 78 can be replaced with the touch pen.

In this construction, the potential gradient along the X axis is formed on the resistance film 71 when the switches 74 and 75 are turned on. Then, the X coordinate of the pushed position is detected when the conductive film 78 is pushed to contact with the resistance film 71, as is mentioned in the former embodiments.

Each of the electrodes 72, the electrodes 73, and the switches 74 comprises a plurality of components being apart from each other. Because of this construction, linearity of the potential gradient is not disturbed as well as excessive, amount of current flown via electrodes out of operation is avoided.

Figure 11:
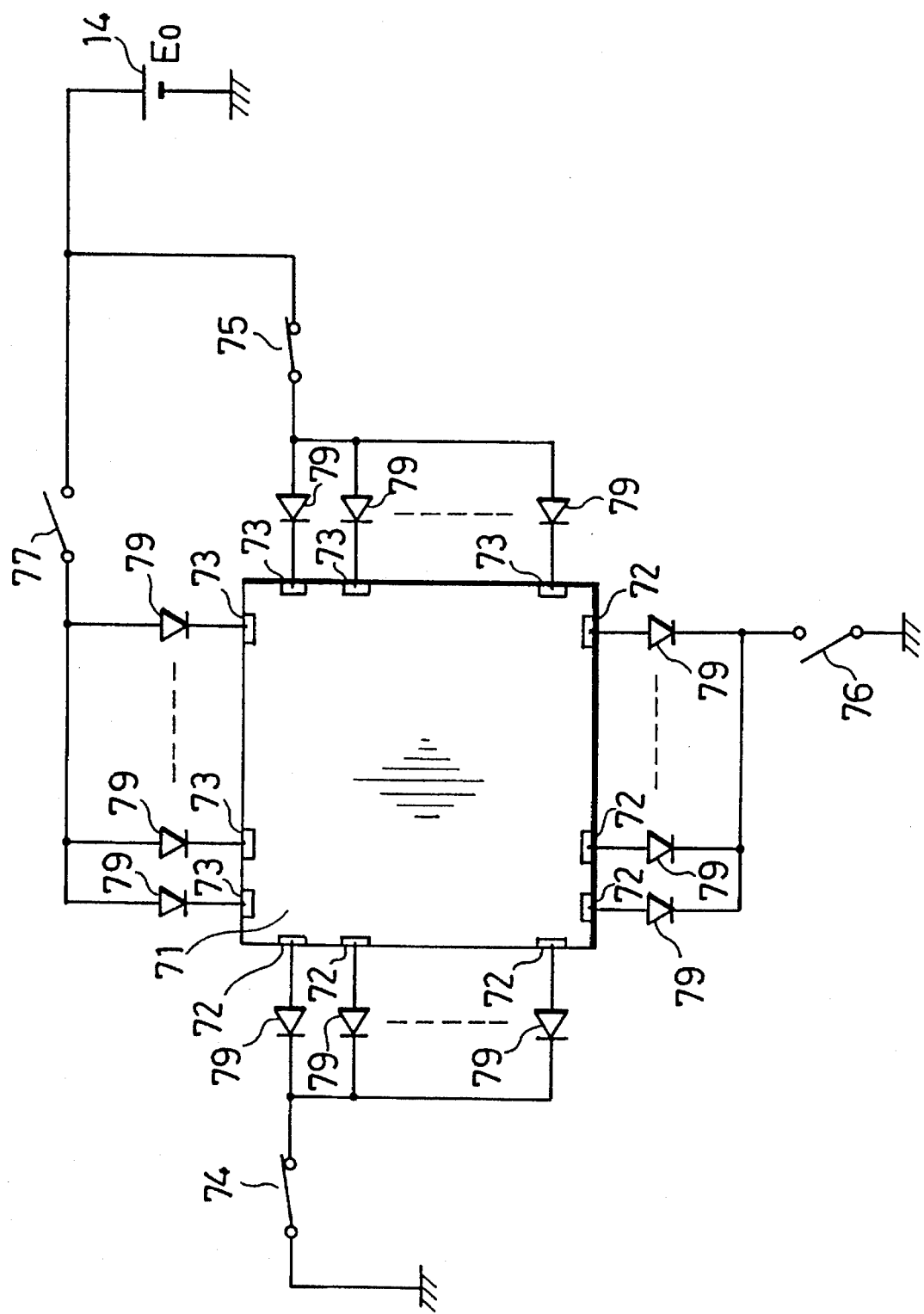
FIG. 11 is an illustration showing a modification of the fifth embodiment of the present invention.

The linearity and reasonable amount of current are also achieved by a construction in FIG. 11. In the figure each of the electrodes 72 or 73 at the end of the conductive film 78 is connected to one of the switches 74–77 via a diode 79.

Embodiment 6

In a sixth embodiment of the present invention another touch panel device detects two dimensional coordinates of each pushed position when a plurality of positions are pushed at one time.

Figure 12:
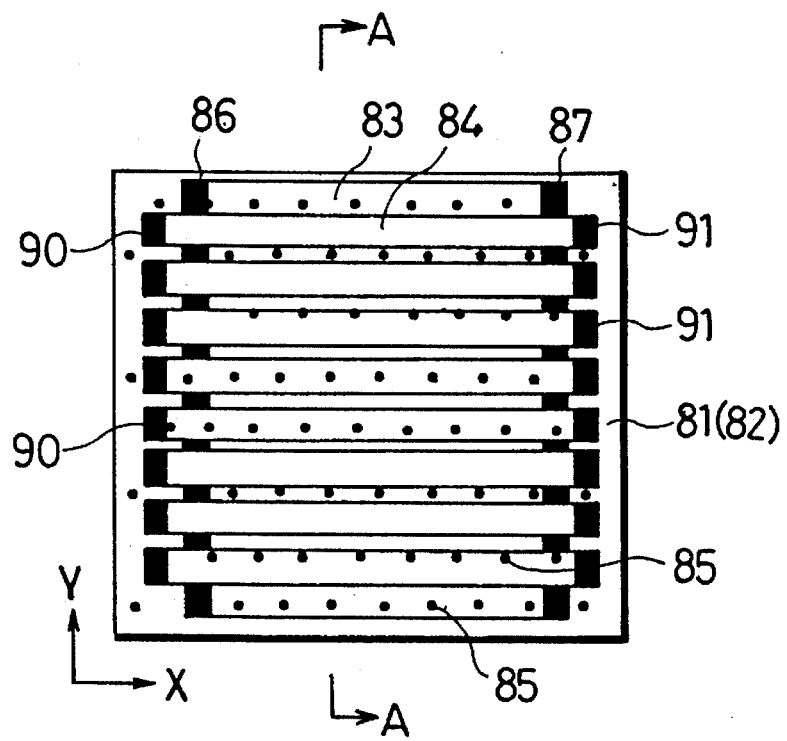
FIG. 12 is a plan view of the touch panel in another touch panel device for detecting the two dimensional pushed position in a sixth embodiment of the present invention.
Figure 13:
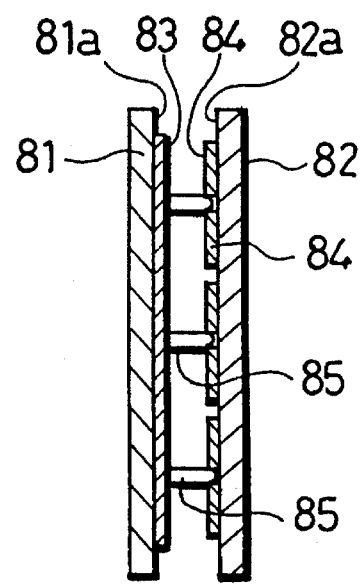
FIG. 13 is a sectional view taken substantially along an arrow A—A in the sixth embodiment of the present invention.

A plan view of the touch panel is shown in FIG. 12 while a sectional view of the touch panel taken along an arrow A—A is shown in FIG. 13.

Construction of the touch panel will be described hereunder with referring to those figures. The touch panel comprises a pair of insulating base materials 81 and 82, a resistance film 83, a plurality of resistance films 84, a spacer 85 for keeping a certain distance between the resistance films 83 and 84. The films 83 and 84 are respectively formed on main surfaces 81a and 82a of the base materials 81 and 82.

The insulating base materials 81 and 82 are formed of transparent polyethylene terephthalete (PET) films in this embodiment. Also employable are glass, plastics and other insulating materials which have appropriate flexibility or elasticity.

The resistance film 83 is extended along the X and Y axes crossing each other perpendicularly. The film 83 desirably has a uniform surface resistance with the maximum tolerance of 2% for the accurate detection. Such a film is produced by sputtering, ion-plating, coating, or vapor depositing an oxide of indium and tin, other metals or metal oxides. The resistance film 83 has outer connecting electrodes 86 and 87 (for example, formed of silver) at both ends thereof, the ends extending along the Y axis.

The resistance films 84 are lengthy strips arranged in parallel, each film being extended along the X axis. The resistance of the film 84 is not required to be uniform but is favorably ten to a hundred times larger than that of the surface resistance film 83 so that the potential gradient on the film 83 is not affected by the current flowing through the film 84 as bypassing around the film 83 when the film 84 contacts with the film 83 at a plurality of contact points. However, according to the principle on which the present invention is based, the current from the power sources 19 and 20 are not necessarily suppressed by the resistance film 84. Accordingly, switch-on resistance of the analog switches 101 and 102 are not necessarily very low while the input impedance of the A/D converter 103 is not necessarily very high, the switches 101 and 102, and the A/D converter 103 being in FIG. 14 to be described in detail later.

The resistance film 84 is formed, for example, by sputtering an oxide of indium and tin on the surface of the insulating base material 82; then it is completed by etching, photolithography or laser processing.

The number of the films 84 can be any. For example, the films 84 may be provided in the number according to the resolution of the conventional matrix system touch panel. In the example described hereunder eight films 84 are provided, and each film 84 has outer connecting electrodes 90 and 91 (formed of silver) at both ends thereof.

Figure 14:
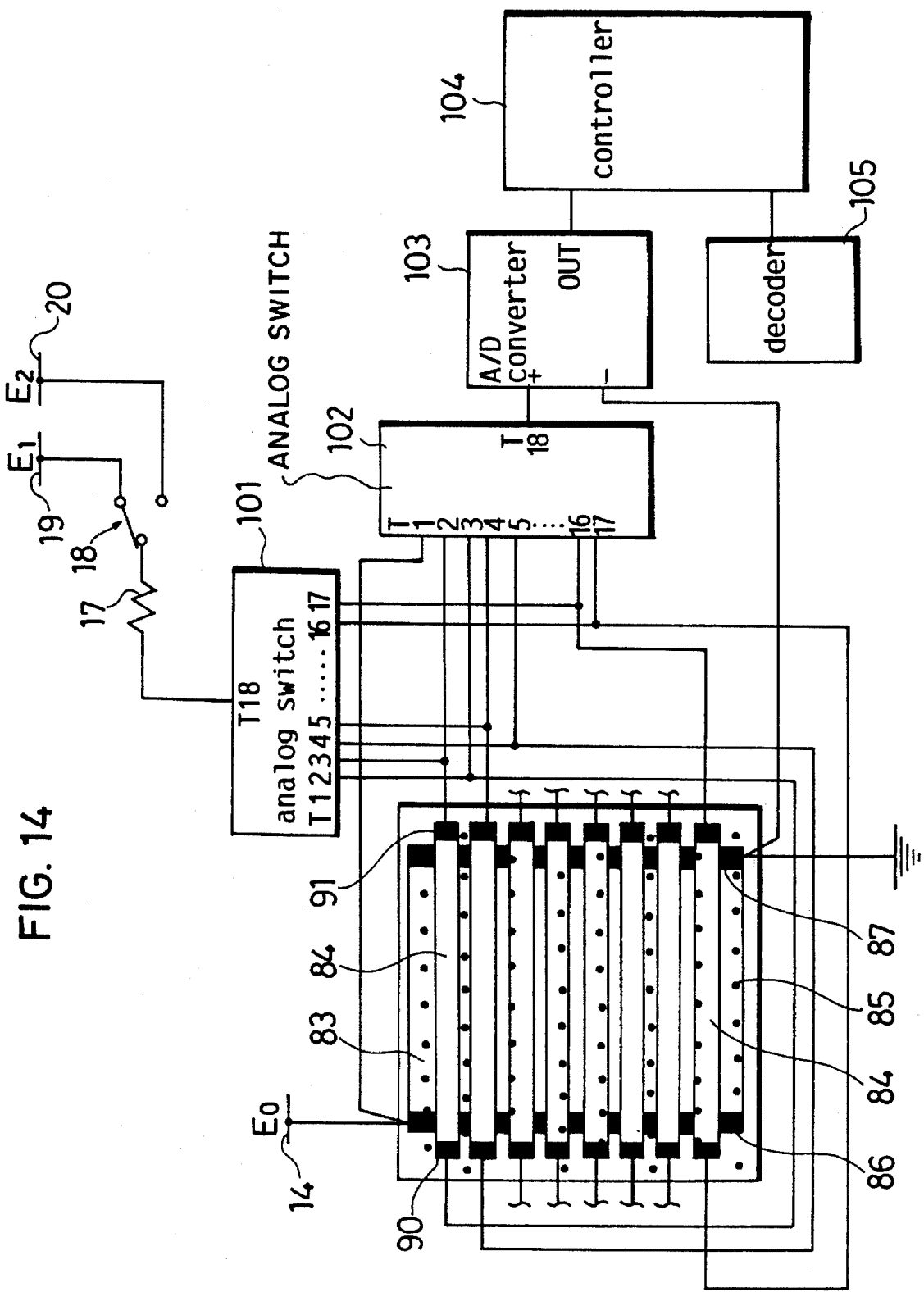
FIG. 14 is an illustration showing the touch panel connected to units such as the pushed position detecting device.

The spacers 85, formed of transparent dots, are provided in the appropriate number at appropriate positions so that they may not interfere contact of the film 83 with the film 84 when the insulating base material is pushed. FIG. 14 shows an overall construction of the embodiment where the touch panel is connected to the pushed position detecting device and the like.

In FIG. 14, the analog switches 101 and 102 have the same construction and are controlled to connect their respective terminals T1 through T17 to terminals T18 one by one, in synchronization concerning the same-numbered terminals, by a controller 104 through a decoder 105. The terminals which are not connected to the terminal 18 are kept at high impedance.

In the analog switch 101, the terminal T18 is supplied with DC potentials E1 and E2 interchangeably by power sources 19 and 20 via the resistor 17 and the switch 18 respectively; while the terminals T2 through T17 are connected to the outer connecting electrodes 90 and 91 at the ends of the resistance film 84. In this construction, E1 and E2 are supplied to all the electrodes 90 and 91 one by one.

In the analog switch 102, the terminal T1 is supplied with DC potential E0, the potential E0 to be supplied to the surface resistance film 83; while the terminals T2 through T17 are connected to the outer connecting electrodes 90 and 91 at the ends of the resistance film 84. The terminal T18 is connected to an A/D converter 103. In this construction, the potential which is supplied to the film 83 is outputted through the terminals T1 and T18 as the reference potential, thereafter the potentials of all the electrodes 90 and 91 are outputted one by one. Particularly, the terminals T2 through T17 of both analog switches 101 and 102 and the electrodes 90 and 91 have such a relationship that, while the electrodes 90 and 91 are selected one by one and electric potential is outputted therefrom, the analog switch 101 may apply E1 and E2 to the electrode which is the opposite to the selected one on the same film 84.

For detecting the pushed position, the electrode 86 of the film 83 is supplied with E0, and the electrode 87 is grounded. The potentials of E1 and E2 supplied to the film 84 are desirably the same or higher than that of E0.

Detection of a plurality of the pushed positions by the touch panel device will be described hereunder. It is supposed that the contact resistance between the surface resistance films 83 and 84 is considerably law; while the resistance of the resistor 17, surface resistance of the film 84, and input/out impedance to each terminal of both the analog switches 101 and 102 are high.

The terminals T1 of the analog switches 101 and 102 are selected by direction from the decoder 105. The terminals T1 and T18 of the analog switch 101 have low impedance (ON), but the terminal T1 is connected to nothing. Therefore, the potentials E1 and E2 are not supplied to any of the films 84. On the other hand, the terminals T1 and T18 of the analog switch 102 are connected to each other. Accordingly, E0 is A/D-converted by the A/D converter 103 and sent to the controller 104. The controller 104 stores the level of E0 for detection of the X coordinate of the pushed position.

Then, the terminals T2 of the analog switches 101 and 102 are selected, thereby the electrode 90 of the uppermost film 84 is supplied with potential such as E1 through the terminals T18 and T2 of the analog switch 101. At this time, the potential of the electrode 91 of the same film 84 is provided to the terminals T2 and T18 of the analog switch 102, and is A/D converted by the A/D converter 103 and sent to the controller 104.

The controller 104 then compares this potential to E0 supplied to the film 83. If the potential of the electrode 91 is the same or higher than E0 supplied to the film 83, the uppermost film 84 is not pushed. In this case, the terminals T4 of the analog switches 101 and 102 are selected, thereby whether the second uppermost film 84 is pushed or not is detected in the same manner.

On the contrary, if the potential of the electrode 91 is smaller than the potential E0 supplied to the film 83, the film 84 is pushed. Then, the pushed position will be detected in accordance with the detected potential.

Figure 15A:
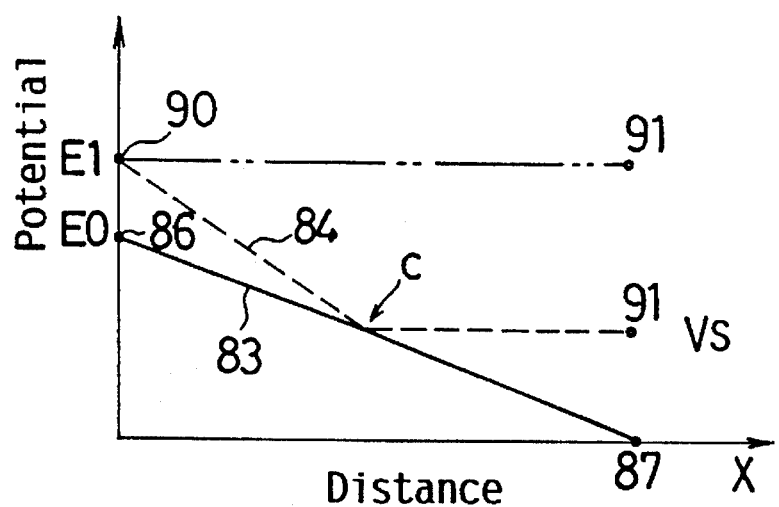
FIG. 15 shows graphical representations which explain detection of a plurality of pushed positions.
Figure 15B:
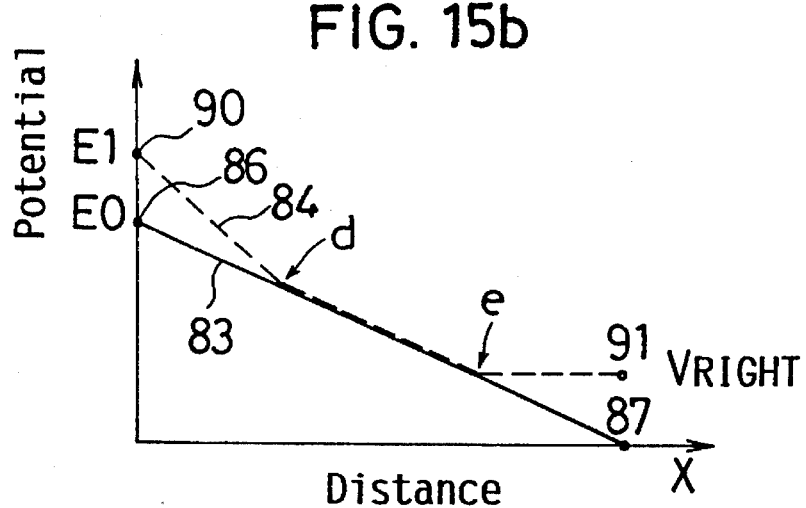
Figure 15C:
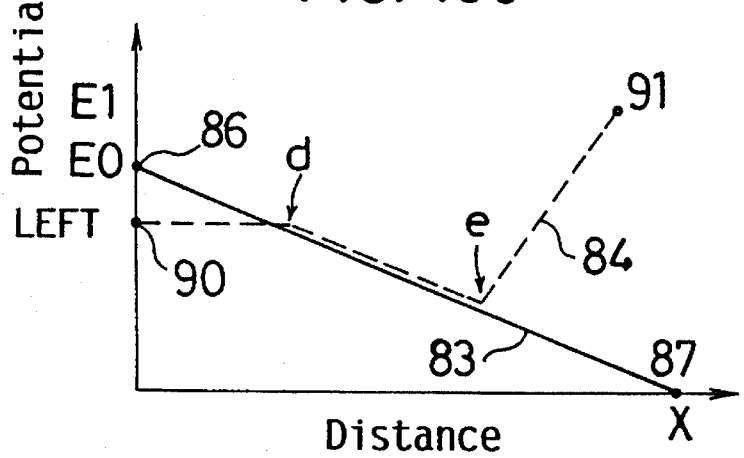

FIGS. 15a, 15b, and 15c show the relationship between the pushed position and the electrodes 86, 87, 90 and 91. As mentioned before, the electrode 86 on one end of the film 83 is supplied with the potential E0 while the electrode 87 at the other end is grounded. Therefore, the potential gradient is formed on the film 83, which is indicated by the solid line in FIGS. 15a, 15b, and 15c. Concerning each film 84, the electrode 90 is supplied with potential such as E1, and the electrode 91 has its potential measured through the analog switch 102.

When the film 84 is not pushed, no current flows, so that the potential of the electrode 91 is the same as E1 supplied to the electrode 90 as shown with the chained line (FIG. 15a).

When the film 84 is pushed and contacts with the film 83 at a point c, the potential at the point c of the film 84 is lowered down to VS which is as low as that of the film 83 at the corresponding point; whereas, the potential gradient of the film 83 is not affected since the resistance of the film 84 is much higher than that of the film 83, ten to a hundred times higher. Then, the electrode 91 obtains the same potential VS as is shown by the dotted line in the figure. The potential VS is inputted to the A/D converter 103, and VS, which has been A/D converted thereby, is then sent to the controller 104. The controller obtains the X coordinate of the pushed position c by computing the above potential VS and the potential E0 supplied to one end of the film 83.

On the other hand, when the film 84 is pushed and contacts with the film 83 at a wider area instead of a point, the potential changes as is shown in FIG. 15 (b) where the left and light ends of the area are referred to as points d and e respectively. As apparent from the figure, the electrode 91 obtains $V_{RIGHT}$, namely, the potential at the point e; then the X coordinate of the point e is detected in accordance with that potential.

After the X coordinate of the point c or e is detected, the decoder 105 directs the analog switches 101 and 102 to select the terminals T3. By this selection, the electrode 91 is supplied with potential such as E1. The potential at the electrode 90 is detected.

When the film 84 contacts with the film 83 at one point such as the point c, the potential at the electrode 90 becomes VS, which is the same as that of the electrode 91 in FIG. 15 (a). Accordingly, the X coordinate of the point c is detected in accordance with the potential VS.

On the other hand, when the film 84 contacts with the film 83 at the area extending from point d to point e, the electrode 90 obtains $V_{LEFT}$, namely, the potential at the point e (FIG. 15c), then the X coordinate of the point e is detected being based on the potential $V_{left}$.

The potentials at the electrodes 90 and 91 of other films 84 are obtained one by one in the same way, whereby the X and Y coordinates of all the points which define the pushed area are detected.

Two potentials are detected at each of the electrodes 90 and 91 interchangeably in accordance with the state of the switch 18 which is connected to either the power source 19 or 20. Accordingly, the accurate detection through the formula 1 or 2 is implemented even when the contact resistance between the films 84 and 83 is large or the surface resistance of the film 84 is small unless it does not affect the potential gradient formed on the film 83.

While in the above detection of the potential E0 at the power source 14 is conducted beforehand, detection of the potentials E1 and E2 of the power sources 19 and 20 besides the potential E0 may precede before detection of the potentials at each of the electrodes 90 and 91.

It is not necessary for the length of the films 84 to extend parallel to the direction of the Y-axis. That is to say, provided that they extend in the general direction of the Y-axis, it is still sufficient for them to be positioned at somewhat of an angle to it.

Embodiment 7

Figure 16:
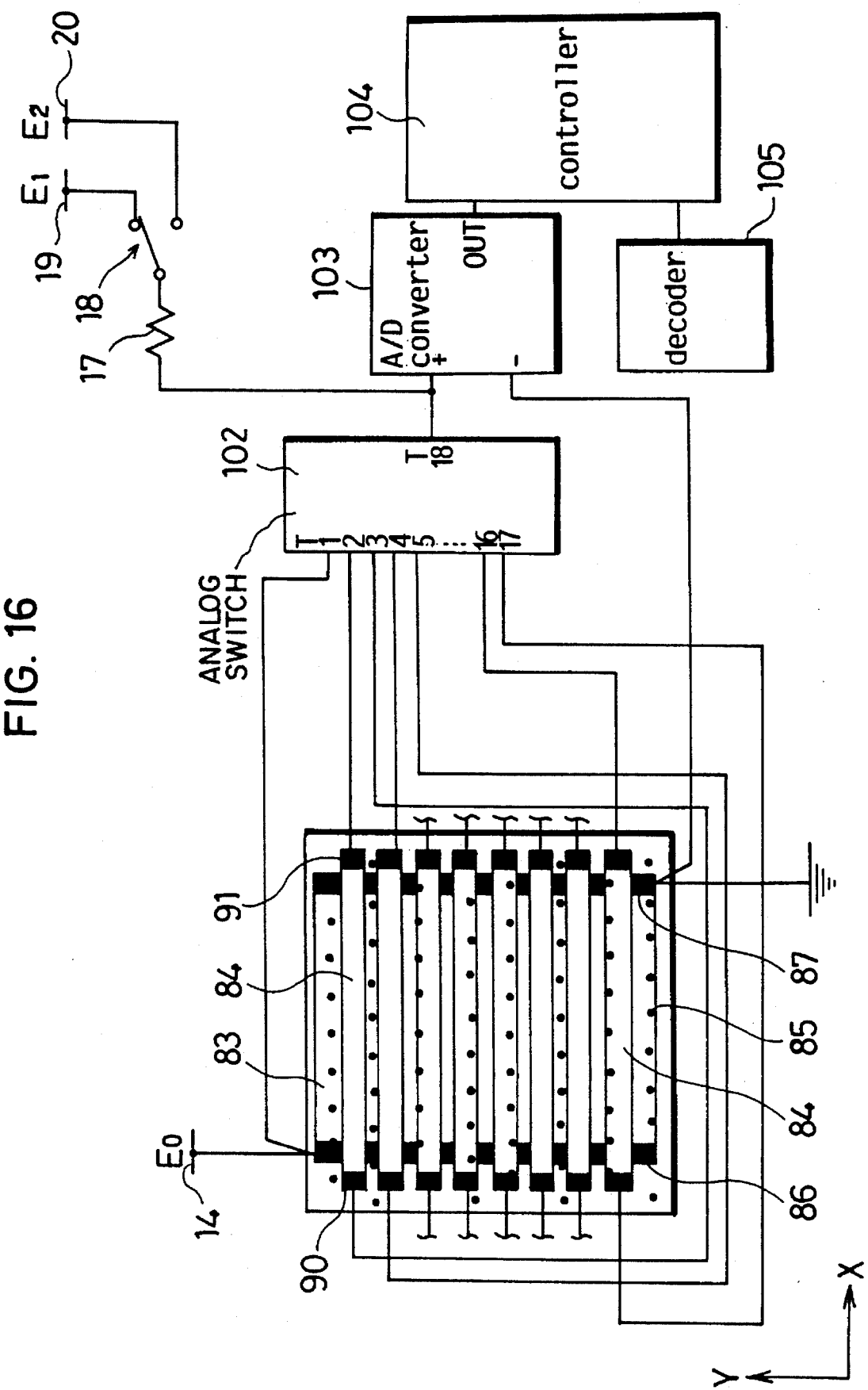
FIG. 16 is an illustration showing a first modification of the sixth embodiment of the present invention, which is referred to as a seventh embodiment.

In a seventh embodiment of the present invention, a touch panel device is constructed as a first modification of that employed in the sixth embodiment. As shown in FIG. 16, the touch panel device is constructed by eliminating the analog switch 101 and connecting the resistance 17 to the terminal T18 of the analog switch 102.

According to the touch panel device in the seventh embodiment, the pushed position is detected accurately regardless of the contact resistance, the same as the second and third embodiments where the resistance 17 is connected either to the electrode 22 or 23 at ends of the resistance film 21.

Embodiment 8

Figure 17:
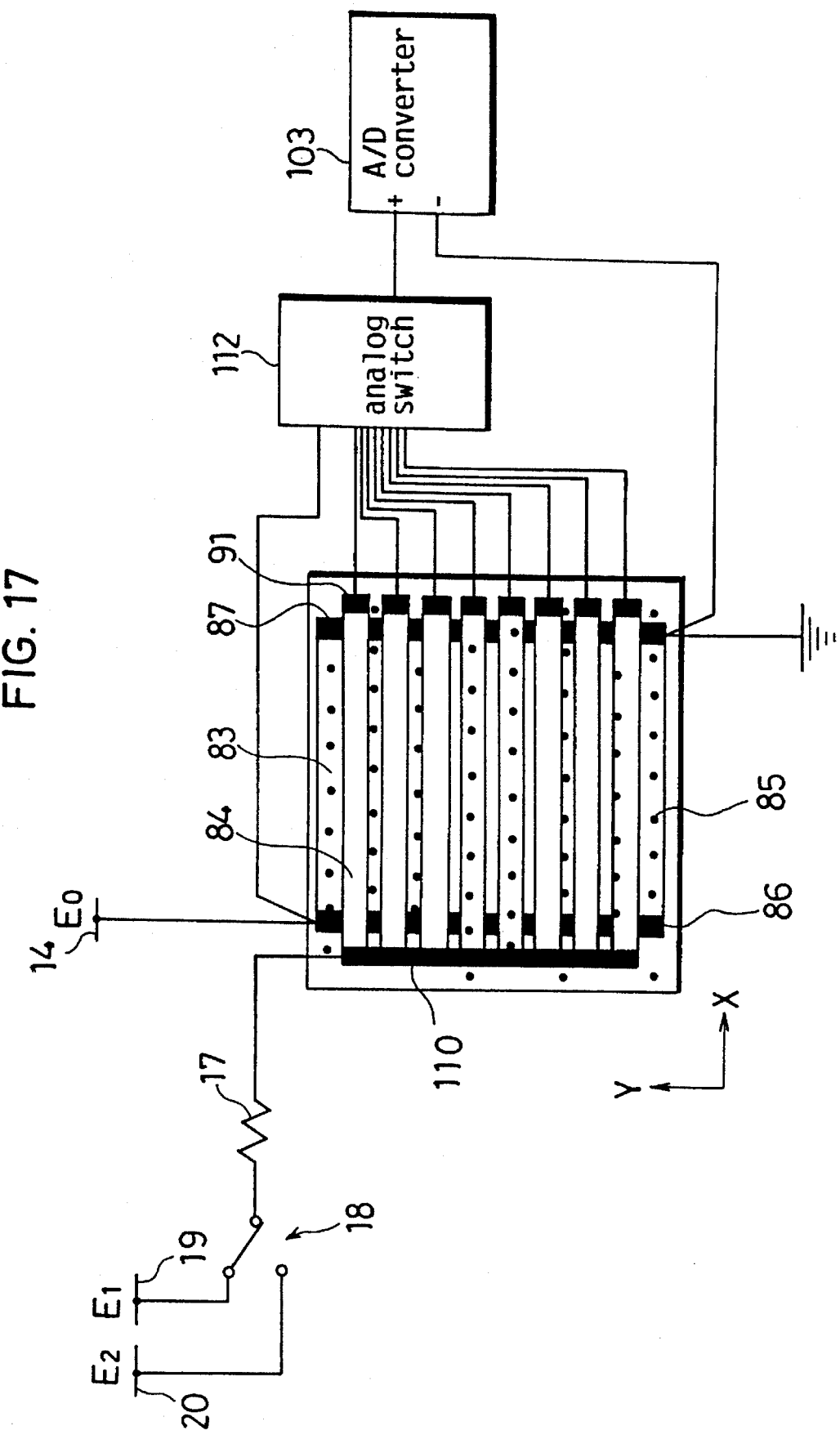
FIG. 17 is an illustration showing a second modification of the sixth embodiment of the present invention, which is referred to as an eighth embodiment.

In an eighth embodiment, a touch panel device as a second modification example of the touch panel device in the sixth embodiment is employed. Such touch panel device is described hereunder with referring to FIG. 17.

In the touch panel device employed in the eighth embodiment, the resistor 17 is connected to a common electrode 110 shared by all the films 84 at one ends thereof. The potentials of the electrodes 91 are selectively detected by an analog switch 112. The number of the terminals of the analog switch 112 is greater than the number of the films 84 by one.

In this construction, if the film 84 is pushed at two or more points, only the rightmost point is detected along the X axis. Along the Y axis, however, all the coordinates of the pushed positions can be detected by detecting the potential of each film 84.

Embodiment 9

Figure 18:
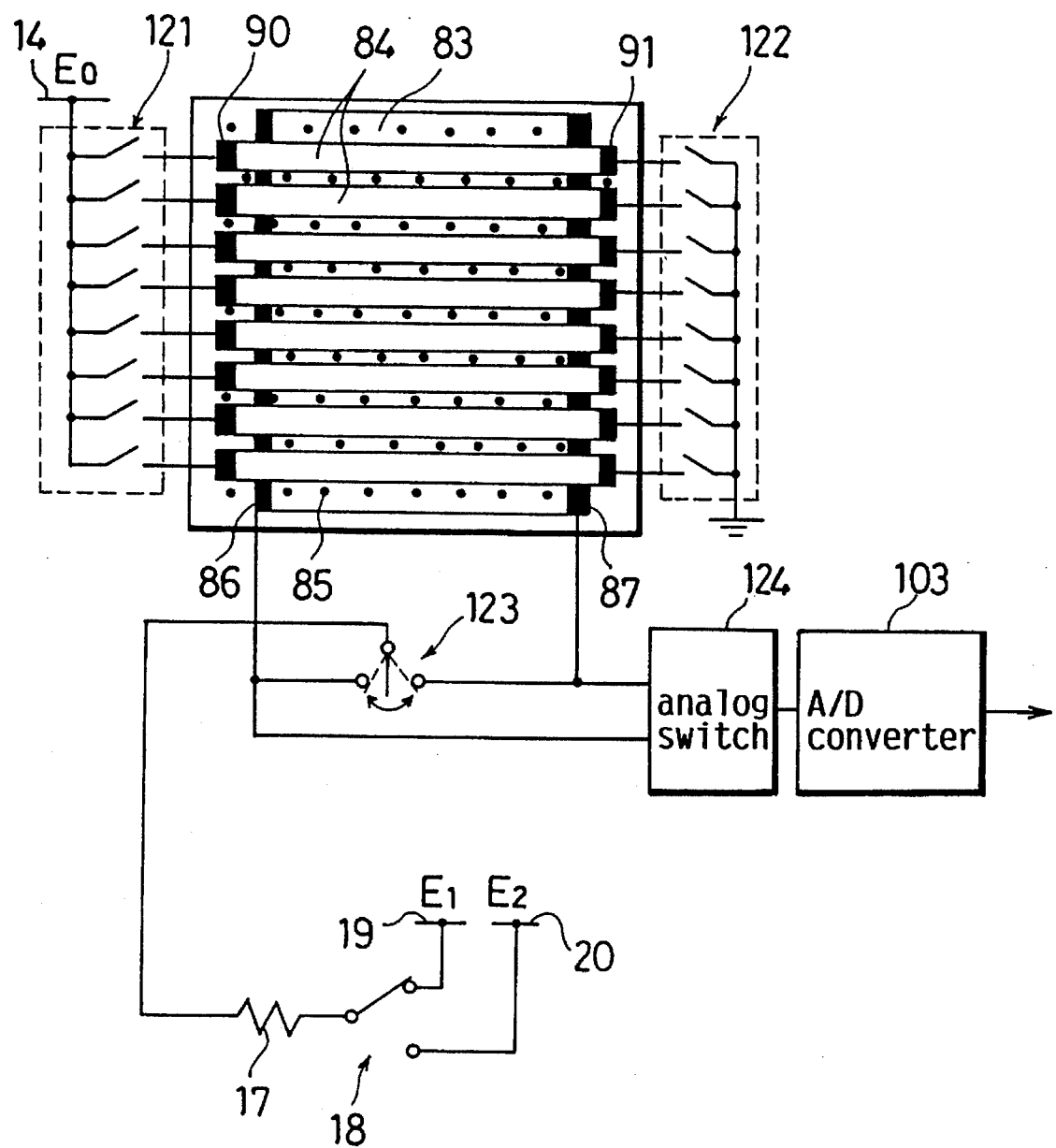
FIG. 18 is an illustration showing a third modification of the sixth embodiment of the present invention, which is referred to as a ninth embodiment.

In a ninth embodiment of the present invention, a touch panel device is constructed as a third modification example of that employed in the sixth embodiment. As shown in FIG. 18, the electrodes 90 are all connected to an analog switch 121 and the electrodes 91 are all connected to an analog switch 122. The analog switches 121 and 122 are controlled to supply E0 to all the films 84 one by one, in synchronization concerning each film.

In this embodiment, each film 84 should have a uniform resistance value, which should be ten to a hundred times lower than that of the film 83.

The electrodes 86 and 87 are connected to the A/D converter 103 through an analog switch 124, which is switched twice as fast as the analog switches 121 and 122. The output from the A/D converter is sent to a controller (not illustrated), as is the same in the sixth embodiment.

The electrodes 86 and 87 are also connected to the power source 19 or the power source 20 via a switch 123, the resistor 17, and a switch 18, the switch 123 being switched as fast as but reversely to the analog switch 124, the switch 18 being switched twice as fast as the switch 123. Briefly, the ratio of the switching speeds for the analog switches 121 and 122, the switch 123, the analog switch 124, and the switch 18 is 1:1:2:2:4. Those switches are switched by the controller through a decoder (not illustrated), as is the same in the sixth embodiment.

In this construction, when the analog switches 121 and 122 select one of the films 84, the selected film 84 obtains the potential gradient based on the potential E0. Then, the potentials of the electrodes 86 and 87 are detected through the analog switch 124. This operation is repeated for all the films 84.

In this way, even if the film 84 is pushed at two or more points along the X axis, all the points can be detected accurately.

Embodiment 10

In a tenth embodiment of the present invention, a touch panel device is constructed to detect amount of pressure put on the pushed point as well as the pushed position.

Figure 19:
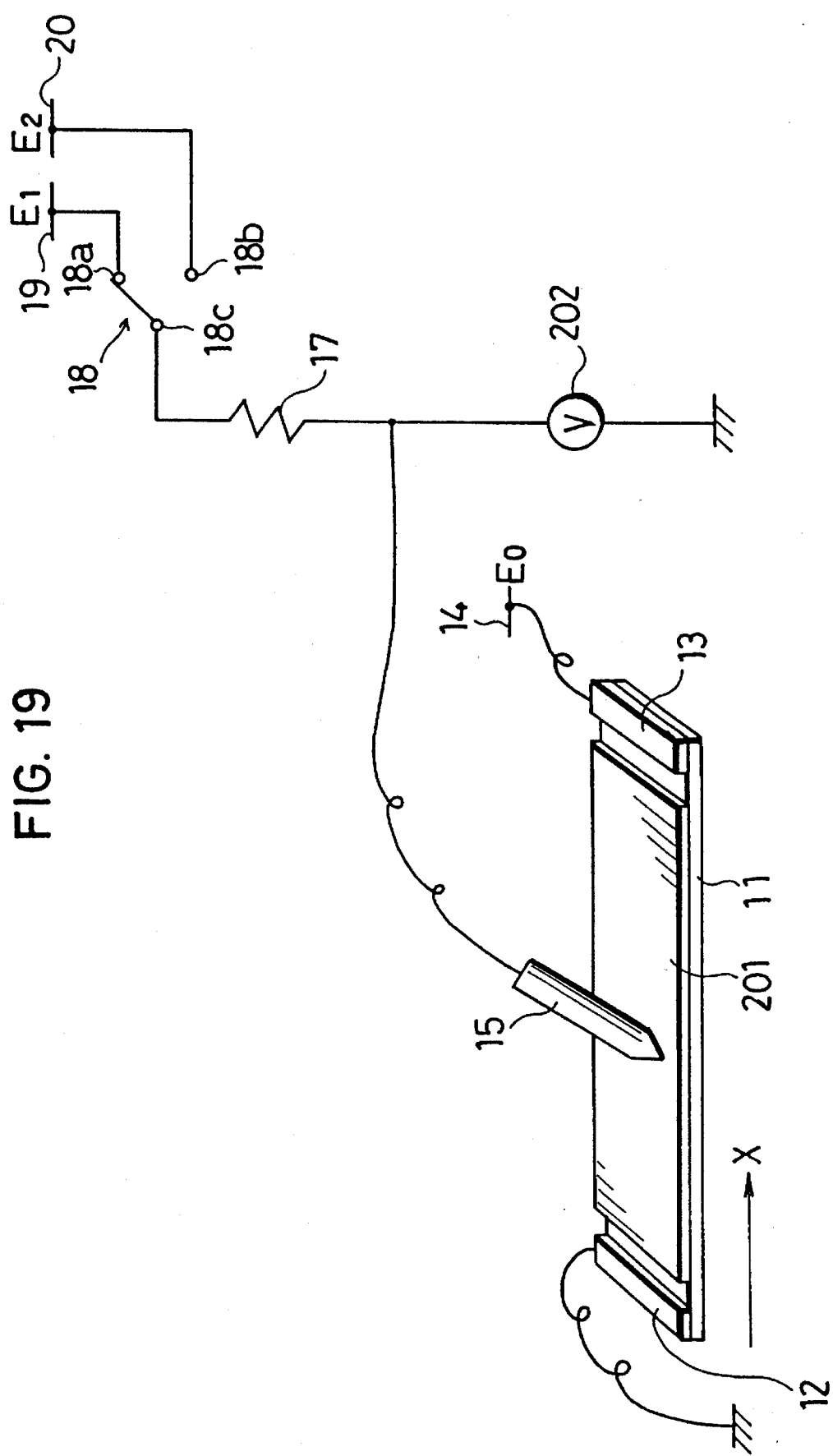
FIG. 19 is an illustration showing a construction of a touch panel device for detecting pressure besides the pushed position as a first example in a tenth embodiment.

As shown in FIG. 19, the touch panel device in this embodiment includes a strip-like pressure sensing conductive material 201. The pressure sensing conductive material 201 consists of a sensing sheet, a sensing film or the like, whose electric resistance varies depending on amount of pressure put thereon, and it is placed on the upper surface of the resistance film 11, which is employed in the first embodiment of the present invention.

Also in this embodiment a pushed position/pressure detecting device 202 is adopted instead of the pushed position detecting unit 16. The device 202 detects pressure put on the pushed point from the resistance n' of the pressure sensing conductive material 201 which is obtained from a formula 3 as well as detects the pushed position x as does the unit 16. When the pressure put on the pressure sensing conductive material 201 and the resistance n' is proportional, the pressure is computed by simply multiplying n' by a conversion coefficient. Otherwise, the resistance n' is converted into the pressure based on a conversion table, which was stored in the device beforehand.

Hence, although the pressure sensing conductive material 201 is placed between the touch pen 15 and the resistance film 11, the accurate detection of the pushed position is implemented. Further, despite the change in the resistance n' of the film 11 the pressure is accurately detected because of the detection conducted in accordance with that change.

[Formula 3]

$$n' = \frac{(VH - VL) \cdot l}{(E1 - E2) - (VH - VL)} - R \cdot x \cdot (1-x)$$

The resistance film and the pressure sensing conductive material may be surface like instead of being strip like for detection of the two dimensional pushed position. The touch panel device may be applicable to a three-dimensionally placement input system, a signature identification system, and the like.

For more accurate detection, the resistance value n' of the pressure conductive material 201 may include the contact resistance between the touch pen 15 and the material 201, to be converted into the pressure. That is, by simply including effect of the contact resistance, which is expressed in a function using amount of pressure, into the conversion coefficient or the conversion table, more accurate detection of the pressure will be implemented.

The pressure is detected with considerable accuracy based on the contact resistance which is expressed in the function of the pressure so that the pressure conductive material 201 may be omitted.

Embodiment 11

Figure 20:
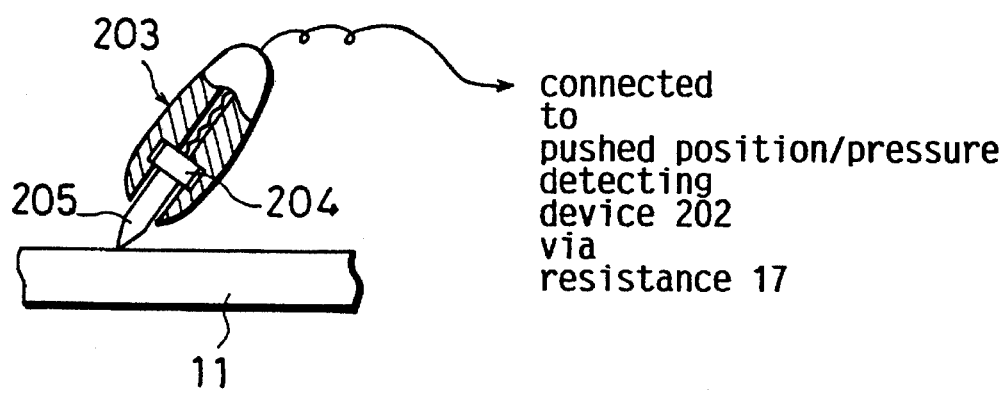
FIG. 20 is a fragmentary sectional view of a second example of the tenth embodiment, which is referred to as a eleventh embodiment.

An eleventh embodiment of the present invention will be described hereunder with referring to FIG. 20. In the figure a pressure conductive material 204 is placed inside a touch pen 203. That is, both the surface potential of the resistance film 11 and the pressure put thereon are applied to the pressure conductive material 204 through a conductive pen head 205.

In this construction, the pushed position can be detected regardless of the change in the resistance of the pressure conductive material 204 as well as the pressure can be detected based on the change in the obtained resistance.

Embodiment 12

Figure 21:
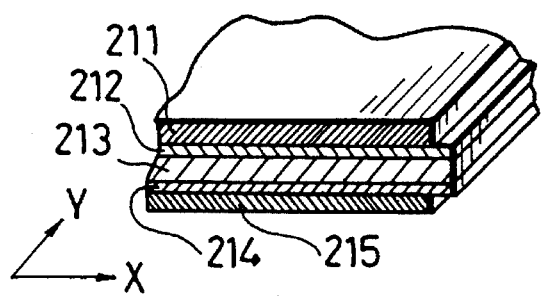
FIG. 21 is a perspective illustration showing a third example of the tenth embodiment, which is referred to as a twelfth embodiment.
Figure 22:
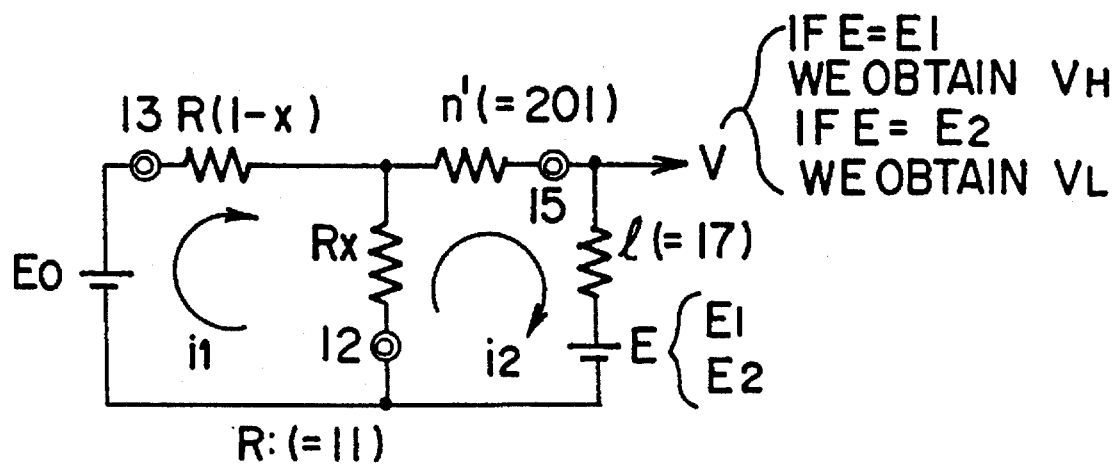
Figure 23:
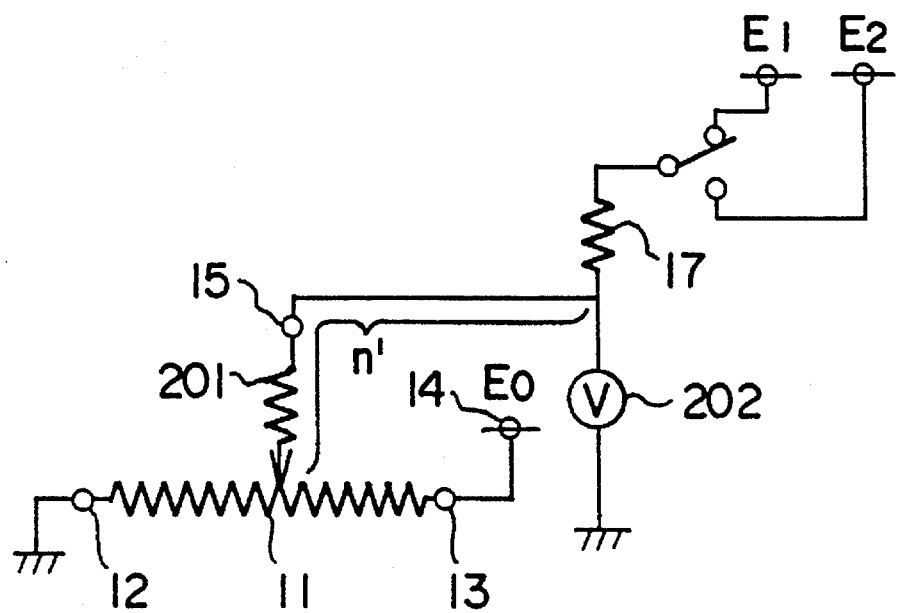

Finally, a twelfth embodiment of this invention will be described hereunder with referring to FIG. 21. As shown in the figure, the touch panel comprises an upper surface film 211 as a protection film, an upper surface resistance film 212 on which the potential gradient along the X axis is generated, the pressure sensing conductive material 213, a lower surface resistance film 214 on which the potential gradient along the Y axis is generated, and a lower surface film formed of glass or the like, all of which being piled in order.

A touch panel device comprising the touch panel connected to the same circuit in the tenth embodiment and the like detects the pushed position and the pressure thereon accurately if the electric resistance in a surface direction of the pressure sensing conductive material 213 is large enough to give few affect on the gradient slopes on the films 212 and 214. Further, the detection accuracy may be improved easily by eliminating the contact resistance among the pressure sensing conductive material 213, the films 212 and 214, all being adhered to each other constantly.

Although the present invention has been described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A touch panel device comprising:

a resistance member which is a resistance film which is elongated in at least one dimensional direction;

first potential supplying means for forming a potential gradient in the one dimensional direction of the resistance material by supplying a fixed potential to the resistance member;

a contact electrode for making contact with the resistance member only when pushed into a pushed position;

second potential supplying means for successively supplying at least two different potentials one at a time to the contact electrode via a resistor, when the potential gradient is being formed on the resistance member;

potential detecting means for detecting different potentials at the contact electrode when the contact electrode is in contact with the resistance member, and, moreover, when the potentials are being supplied by the second potential supplying means to the contact electrode; and pushed position calculation means for calculating a pushed position in the one dimensional direction, based on the different potentials detected by the potential detecting means.

2. The touch panel device of claim 1, wherein the first potential supplying means is connected to the resistance member so that one potential is supplied at a first contact and at a second contact;

the second potential supplying means is constructed so as to supply two kinds of potential to the contact electrode; and the pushed position calculation means includes a calculator for finding a ratio x of a distance between one end of the resistance member and the pushed position to a distance between one contact and the other contact, according to an equation below:

$$x = \frac{E1 VL - E2 VH}{E0\{(E1 - VH) - (E2 - VL)\}}$$

wherein E0 is the potential at one contact, E1, E2 are two kinds of potential supplied by the second potential supplying means, and VH, VL are the potentials detected by the potential detecting means.

3. The touch panel device of claim 1, wherein the contact electrode is a touch pen whose head is a conductive part.

4. The touch panel device of claim 1, wherein the contact electrode is comprised of a flexible resistance film which is constructed over an area of the resistance member where the potential gradient is formed, but is separated from it at a fixed distance by a space.

5. The touch panel device of claim 1, wherein the resistance member is a sheet-like resistance member extending in two dimensions;

the first potential supplying means is constructed of an x-axis potential supplying unit for supplying a fixed potential along a direction of an x-axis, a y-axis potential supplying unit for supplying a fixed potential along a direction of a y-axis, and a switching unit for alternately making the x-axis potential supplying unit and the y-axis potential supplying unit operational; and the pushed position calculation means calculates, every time a potential gradient is formed in one of the axes, a pushed position in an axis which has the potential gradient formed, based the number of different potentials detected by the potential detecting means.

6. The touch panel device of claim 5, wherein the resistance member is a square shape, and includes a number of electrodes along its edges which are separate from each other; and the first potential supplying means forms a potential gradient by supplying a fixed potential across the resistance member via a member of electrodes along one side of the resistance member and electrodes on an opposite side of the resistance member.

7. The touch panel device of claim 6, wherein the first potential supplying means is constructed so as to be connected to every electrode via diodes for every electrode.

8. The touch panel device of claim 1, further comprising a pressure calculation means, wherein the pressure calculation means includes a pressure sensitive conducting material, the resistance of a part of which, which has an electric current passing through it via the contact electrode and, moreover, a pressure applied, changes in accordance with the applied pressure, and the pressure calculation means calculates the resistance of the pressure sensitive conducting material and deduces the applied pressure, based on the potentials detected by the potential detecting means, when the number of different potentials are being applied to the contact electrode.

9. The touch panel device of claim 8, wherein the potential at one end of a fixed axis of the resistance member is O, while a potential at another end is E0, resistance between one end and the other end is R, a ratio of a distance between the one end and the pushed position to a distance between the one end and the other end is x, and a resistance value of the resistor is l, and the pressure calculation means calculates the applied pressure as a value n' below;

$$n' = \frac{(VH - VL) \cdot l}{(E1 - E2) - (VH - VL)} - R \cdot x (1 - x).$$

10. A touch panel device, comprising;

a pair of flat resistance films which are flexible and are constructed so as to face each other with a fixed distance between them;

a first potential supplying means for supplying a fixed potential alternately to each of the pair of flat resistance films, and, by supplying the fixed potential in an x-axis of one of the flat resistance films and in a y-axis another of the flat resistance films, forming a potential gradient alternatively in the x-axis and the y-axis on the flat resistance films;

second potential supplying means for successively supplying at least two different potentials one at a time via a fixed resistor, when there is a potential gradient being formed in one of the flat resistance films, to the other flat resistance film;

potential detection means for detecting potentials in the flat resistance film to which potentials are being supplied by the second potential supplying means; and pushed position calculation means for calculating a pushed position in the x-axis, based on the different potentials detected by the potential detecting means, when a potential gradient is being formed in a direction of the x-axis on one flat resistance film, and for calculating a pushed position in the y-axis, based on the different potentials detected by the potential detecting means, when a potential gradient is being formed in a direction of the y-axis on another flat resistance film.

11. The touch panel device of claim 10, further comprising pressure calculation means, including a pressure sensitive conducting material whose resistance changes with supplied pressure, disposed between the two flexible flat resistance films so that it is adhered to both of said two flexible flat resistance films, for calculating the resistance of the pressure sensitive conducting material and deducing the supplied pressure based on the potential detected by the pressure detecting means when the different potentials are supplied across the flat resistance films.

* * * * *